United States Patent Office 2,931,121
Patented Apr. 5, 1960

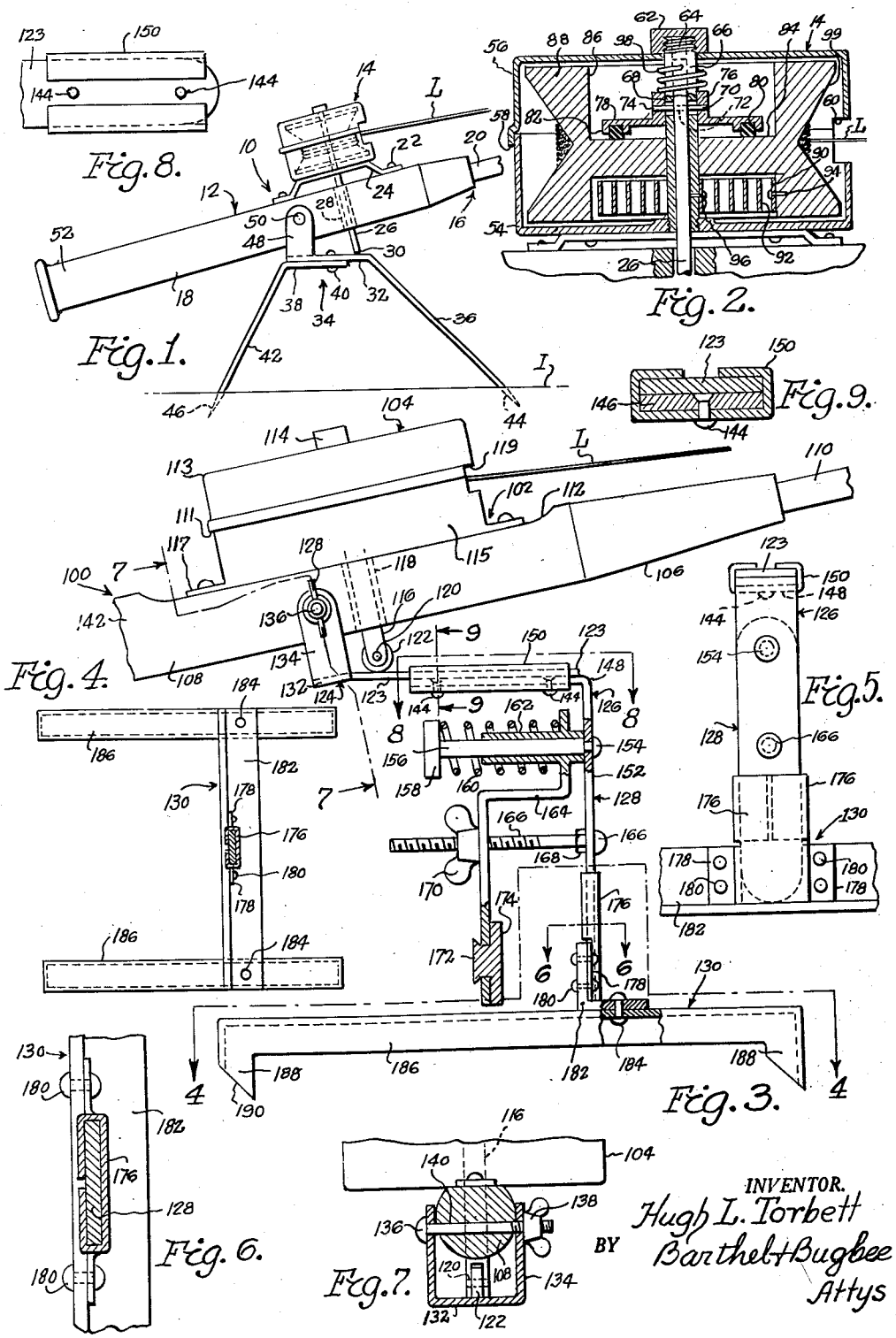

2,931,121
STRUCTURE-SUPPORTED SPRING-WOUND FISHING ROD AND REEL COMBINATION

Hugh L. Torbett, Detroit, Mich.

Application June 10, 1957, Serial No. 664,562

2 Claims. (Cl. 43—15)

This invention relates to fishing reels and, in particular to structure-supported fishing rod and reel combinations.

One object of this invention is to provide a structure-supported spring-wound automatic fishing reel and rod combination wherein tilting of the rod downward toward the supporting structure in response to a tug on the fishing line by a biting fish actuates the reel by automatically releasing the reel spool brake to jerk the line and thereby set the hook in the mouth of the fish.

Another object is to provide a structure-supported spring-wound automatic fishing reel and rod combination of the foregoing character wherein the reel is provided with a brake-releasing member which extends downwardly through an aperture in the fishing rod handle into engageability with the supporting structure for automatic shifting in response to fish-actuated rod tilting.

Another object is to provide a structure-supported spring-wound automatic fishing reel and rod combination of the foregoing character wherein the fishing rod is pivotally mounted upon a supporting structure which is adapted either to rest upon and embed itself in the ice for ice fishing or is alternatively adapted to be clamped to the gunwale or other supporting member of a boat, dock or other water-side object.

Another object is to provide a structure-supported spring-wound automatic fishing reel and rod combination of the foregoing character wherein the supporting structure is constructed and arranged in freely separable components whereby the fisherman may normally leave his rod-and-reel combination supported by the supporting structure but may instantly take up the combination in his hands to play or land the fish merely by separating the freely-separable components of the supporting structure.

This application is a continuation in part of my co-pending application Serial No. 590,716 for Automatic Fishing Reel, filed June 11, 1956.

Other objects and advantages of the invention will become apparent during the course of the following description of the accompanying drawings, wherein:

Figure 1 is a side elevation of a structure-supported spring-wound automatic fishing reel and rod combination, according to one form of the invention, with the major portion of the rod omitted to conserve space;

Figure 2 is an enlarged central vertical section through the automatic fishing reel shown in Figure 1, as mounted on the rod;

Figure 3 is a side elevation, partly in section, of a modified structure-supported spring-wound automatic fishing reel and rod combination with freely-separable components and adapted alternatively for ice-supported or boat-supported use;

Figure 4 is a horizontal section through the ice-supported base of the supporting structure of Figure 3, taken along the line 4—4 therein;

Figure 5 is a fragmentary front elevation of the upright portion of the supporting structure shown in Figure 4, looking from the right in Figure 3;

Figure 6 is an enlarged fragmentary horizontal cross-section taken along the line 6—6 in Figure 3;

Figure 7 is an enlarged fragmentary approximately vertical section through the pivotal mounting of the reel and rod combination upon the supporting structure taken along the line 7—7 in Figure 3;

Figure 8 is a fragmentary top plan view of the freely-separable connection between the separable components of the supporting structure of Figure 3, taken along the line 8—8 therein; and Figure 9 is an enlarged fragmentary vertical section through the separable connection of Figure 8, taken along the line 9—9 in Figure 3.

Referring to the drawings in detail, Figures 1 and 2 show a structure-supported spring-wound automatic fishing reel and rod combination or ice fishing tip-up, generally designated 10, and specifically arranged for ice-supported use in ice fishing as a so-called automatic ice-fishing tip-up. The device 10 consists generally of a spring-wound automatic fishing reel and rod unit 12 which in turn is further subdivided into a spring-wound automatic reel 14 and an associated fishing rod 16 including a handle 18 in which is mounted a forward fishing rod portion 20. Secured to the rod handle 18 as by the fasteners 22 is a reel bracket 24 upon which the reel 14 is directly mounted in slightly-spaced relationship to the handle 18. The reel 14 is provided with a reciprocable operating shaft or plunger 26 which extends downwardly through a transverse hole 28 in the rod handle 18 with its lower end 30 engageable with the upper horizontal portion 32 at the top of a tripod, generally designated 34, having an inclined forward leg 36 integral with the upper horizontal portion 32. The tripod 34 is provided with a lower horizontal portion 38 riveted or otherwise secured as at 40 alongside the upper horizontal portion 32 and having horizontally-spaced twin rearward legs 42 inclined downwardly from the lower horizontal portion 38. The legs 36 and 42 are preferably provided with sharp points 44 and 46 respectively, so as to be capable of being embedded in the ice I (Figure 1).

Integral with and rising from the upper horizontal portion 32 are horizontally-spaced upstanding parallel ears 48 bored in alignment to receive a horizontal pivot pin 50 which collectively form a fishing rod holder for the fishing rod 16. The pivot pin 50 passes through the rod handle 18 and pivotally supports the latter at a location spaced longitudinally away from the hole 28 through which the reel-operating shaft 26 passes (Figure 1). The rod handle 18 has its pivot pin 50 located forward of the center of gravity of the reel and rod unit 12, the butt 52 of the rod handle 18 being counterweighted, if necessary, so that the rod 16 normally remains in the upwardly- and forwardly-tilted position shown in Figure 1.

The reel 14 (Figure 2) is enclosed in lower and upper casing halves 54 and 56 respectively joining one another in an overlapped flange 58 at the upper edge of the lower half 54 and provided with an aperture 60 for the passage of the fishing line L. The casing halves 54 and 56 are held in assembly by a cap nut 62 threaded onto the threaded upper end 64 of a hollow shaft 66. The latter is slotted as at 68 to receive a transverse pin 70. The slot 68 is axially-elongated to permit limited reciprocation of the pin 70 and operating shaft or plunger 26 in which it is transversely mounted as in the hole 72. The outer ends of the pin 70 are seated in aligned holes 74 in the hub 76 of a disc brake 78, the lower surface of which is annularly grooved as at 80 to receive a brake ring 82.

The brake ring 82 is of suitable frictional material such as leather or the like and frictionally engages the brake surface 84 at the bottom of a cupped upper recess 86 in a line spool 88. The spool 88 is provided with a cupped lower recess 90 containing a spiral spring 92, the outer end of which is connected as by the fastener 94 to the spool 88 and the inner end by the fastener 96 to the hollow shaft 66. The latter is bored near its upper end to receive the upper end of a compression spring 98, the lower end of which engages the brake hub 76 to urge the brake 78 into braking engagement with the brake surface 84 of the line spool 88. The latter is provided with an outer annular line-receiving groove 99 upon which the fishing line L is wound in the usual way.

In the operation of the automatic ice-fishing tip-up 10 of Figures 1 and 2, the spring 92 of the reel 14 is wound up by unscrewing the cap nut 62, removing the upper casing half 56 and winding up the spool 88 directly by means of the fingers. The spring 98 normally urges the brake 78 into frictional holding engagement with the spool braking surface 84 to hold the spool 88 against rotation and retain the spring 92 in its wound-up condition. Enough of the line L is paid out, according to the depth of the water, in order to place the hook and bait (not shown) at the desired fishing depth. When the tip-up 10 is idle, the preponderant weight of the fishing rod handle butt 52 tilts the real and rod assembly 12 upward and forward as shown in Figure 1. It will be understood, of course, that the tripod 34 has been firmly seated in the ice I by embedding the pointed ends 44 and 46 of its forward and rearward legs 36 and 42 in the ice, as shown in Figure 1.

When a fish bites at the bait and hook, the consequent jerk on the line L pulls the tip of the rod portion 20 downward, in effect pushing the plunger 26 upward by reason of the engagement of its lower end 30 with the upper horizontal portion 32 of the tripod 34. This action, transmitted through the cross pin 70 to the brake hub 76, pushes the brake 78 out of braking engagement with the brake surface 84 of the line spool 88, releasing the latter. The wound-up spring 92 then winds with a jerk which imparts a sudden rotation to the spool 88 and consequently imparts a jerk to the line L which firmly sets the hook in the mouth of the fish. The further unwinding of the spring 92 and further rotation of the spool 88 thereby reels in the line L to take up any slack and keeps it taut, so that the fish cannot escape even when attempting to run with the hook. The fisherman then lands the fish in the usual way.

The modified structure-supported spring-wound automatic fishing reel and rod combination, generally designated 100, shown in Figures 3 to 9 inclusive consists generally of a spring-wound automatic fishing reel and rod unit 102 which in turn is further subdivided into a spring-wound automatic reel 104 and an associated fishing rod 106 including a handle 108 in which is mounted a forward fishing rod portion 110. The fishing reel 104 is of substantially identical internal construction to the fishing reel 14, with a casing 111 composed of interfitting upper and lower halves 113 and 115, the latter of which has mounting lugs 117 by which it is secured to an inset reel seat 112 formed as a cutaway portion of the handle 108. A cap nut 114, like the cap nut 62, secures the upper casing half 113 to the threaded upper end of a tubular shaft (not shown) similar to the tubular shaft 66. An aperture 119 is formed in the casing halves 113 and 115 for the passage of the fishing line L. The reel 104 is provided with a reciprocable operating shaft or plunger 116 similar to the plunger 26 of the reel 14 and similarly extending downwardly through a transverse hole 118 in the rod handle 108 with its lower end bifurcated and drilled transversely to receive a pivot pin 120 rotatably supporting a roller 122.

The roller 122 engages the forward portion or tongue 123 or the separable upper component 124 of a combination supporting structure, generally designated 126, having an intermediate separable component 128 which in turn is separably associated with a lower component or base 130. Integral with and rising from the slightly inclined rearward end portion 132 of the upper separable component 124 are horizontally-spaced upstanding parallel ears 134 (Figure 7) which are bored in alignment to receive a horizontal pivot bolt 136 having a wing nut 138 threaded thereon. The pivot bolt 136 passes through a hole 140 in the rod handle 108 at a location spaced longitudinally away from the hole 118 through which the operating shaft 116 passes (Figure 3) and pivotally supports the rod handle 118, rod portion 110 and reel 104. As before, the rod handle 108 has its pivot bolt 136 located forward of the center of gravity of the rod and reel unit 102, the butt 142 of the rod handle 108 being counterweighted, if necessary, so that the rod 106 normally remains in the upwardly and forwardly tilted position shown in Figure 3.

Welded, riveted or otherwise secured as at 144 to the horizontal portion 146 of the inverted L-shaped bracket 148 of the intermediate component 128 is an elongated hollow guide or socket 150 (Figures 3 and 9) which slidably and removably receives the tongue 123 of the upper separable component 124. The vertical portion 152 of the bracket 148 is drilled to receive the reduced diameter end portion 154 of a headed spring-retaining pin 156, the head 158 of which serves as an abutment for one end of a compression spring 160 encircling the pin 156. The reduced diameter end 154 of the pin 156 is upset externally to secure it firmly to the bracket 148. Slidably mounted on the pin 156 is a tubular hub 162 carrying a Z-shaped arm 164 engaged by the forward end of the spring 160 which thereby urges it toward the bracket 148. The intermediate portion of the bracket 148 is drilled as an anchorage for the forward enlarged end of a clamping bolt 166 held thereagainst by a collar or enlargement 168 and having its rearward or free end threaded to receive a wing nut 170, the Z-shaped arm 164 being drilled for the passage of the clamping bolt 166. The lower end portion of the Z-shaped arm 164 is drilled to receive the upset or headed shank 172 of a contact button or pad 174 mounted on the side thereof facing the bracket 148.

The lower end portion of the vertical part 152 of the inverted L-shaped bracket 148 is slidably and separably inserted in an upstanding hollow guide or socket 176 (Figures 3, 5 and 6) of rectangular cross-section and having a tang 178 riveted or otherwise secured as at 180 to an angle cross bar 182. The angle cross bar 182 forms the bridge portion of the base or lower separable component 130 and has riveted or otherwise secured as at 184 near its opposite ends a pair of parallel supporting channel rails 186 (Figure 4) of approximately U-shaped cross-section with downturned forward and rearward pointed ends 188 and 190 respectively (Figure 3) adapted to embed themselves into the ice.

In the operation of the modified structure-supported spring-wound automatic fishing reel and rod combination 100 of Figures 3 to 9 inclusive, the operating spring of the reel 104 is wound up in the manner described above in connection with the operation of the form of the invention shown in Figures 1 and 2. Let it be assumed that the combination 100 is to be used in its completely assembled form of Figure 3 as an ice fishing tip-up, in which case the operator digs the pointed ends 188 and 190 of the channel rails 186 into the ice adjacent the location where the hole is to be chopped, such as inside the fishing shanty or other shelter. As before, enough of the line L is payed out, according to the depth of the water, in order to locate the hook and bait (not shown) at the desired fishing depth. When the combination 100 is idle, the preponderant weight of the fishing rod handle butt 142 tilts the reel and rod assembly 102 upward and forward (Figure 3) so that the plunger 116 is not actuated to release the spool brake within the reel 104.

When a fish bites at the bait and hook and consequently jerks the line L so as to pull the tip of the rod portion 110 downward, the engagement of the roller 122 with the tongue 123 of the separable upper component 124 in effect pushes the plunger 116 upward to release the spool brake, whereupon the reel-operating spring unwinds with a jerk to impart a corresponding jerk to the spool and line L, which firmly sets the hook in the mouth of the fish. The further unwinding of the reel-operating spring reels in the line to take up any slack and thereby keeps the line taut so that the fish cannot shake the hook out of its mouth. In this manner, a constant tension is maintained on the line which gives the fish more line if it wishes to run with the bait, yet prevents it from taking advantage of the slack which develops in ordinary manual reels to dislodge the hook. The fisherman, by grasping the handle 108 and pulling rearwardly upon the rod 106 can pull the tongue 123 out of its socket or guide 150 and land the fish in the ordinary way. When the bait and reel are reset for further fishing, the tongue 123 is replaced by the guide or socket 150 in the manner shown in Figure 3.

If, on the other hand, the fisherman is fishing otherwise than through the ice, such as from a boat or off a dock, he detaches the vertical portion 152 of the inverted L-shaped bracket 148 of the supporting structure 128 from the base or lower component 130 merely by pulling upward upon it to pull the lower end of the vertical portion 152 of its guide or socket 176. He then loosens the wing nut 170 on the bolt 166 and pulls back the Z-shaped arm 164 in order to insert the gunwale of the boat or other fixed supporting member between the pad 174 and the lower end of the vertical portion 152 of the L-shaped bracket 148. The spring 160 then urges these parts into engagement with the opposite sides of the gunwale, whereupon the wing nut 170 may be screwed inward upon the bolt 166 to firmly clamp these parts against the gunwale or other supporting member.

What I claim is:

1. A stand-supported automatic fishing reel and rod combination, comprising a stand structure, a fishing rod pivotally mounted on said stand structure for vertical swinging relatively thereto, a reel housing mounted on said rod, a fishing line spool rotatably mounted in said housing and adapted to receive a fishing line, a spring anchorage on said housing, a windable spool-rotating spring operatively connected between said anchorage and said spool and in its wound condition normally urging said spool into rotation reeling in the fishing line, a brake movably mounted in said housing adjacent said spool, means normally urging said brake into rotation-preventing braking engagement with said spool, a movable brake release member operatively connected to said brake, and means responsive to the downward swinging of said rod following a pull by a fish upon said fishing line for moving said brake release member into brake-releasing relationship with said spool and consequently effecting spring-actuated rotation of said spool to reel in the line.

2. A stand-supported automatic fishing reel and rod combination, according to claim 1, wherein the brake release member extends into engageability with the stand structure at a location spaced away from the pivot of the fishing rod upon the stand structure and engages said stand structure in response to said downward swinging of said rod.

References Cited in the file of this patent

UNITED STATES PATENTS

| 371,777 | McCabe | Oct. 18, 1887 |
| 871,345 | Kleinschmidt | Nov. 19, 1907 |
| 2,439,847 | Disotell | Apr. 20, 1948 |
| 2,574,216 | Lindgren | Nov. 6, 1951 |
| 2,628,048 | McKinney | Feb. 10, 1953 |
| 2,664,661 | Kohn | Jan. 5, 1954 |
| 2,851,813 | Gugliotta | Sept. 16, 1958 |